United States Patent Office 3,681,169
Patented Aug. 1, 1972

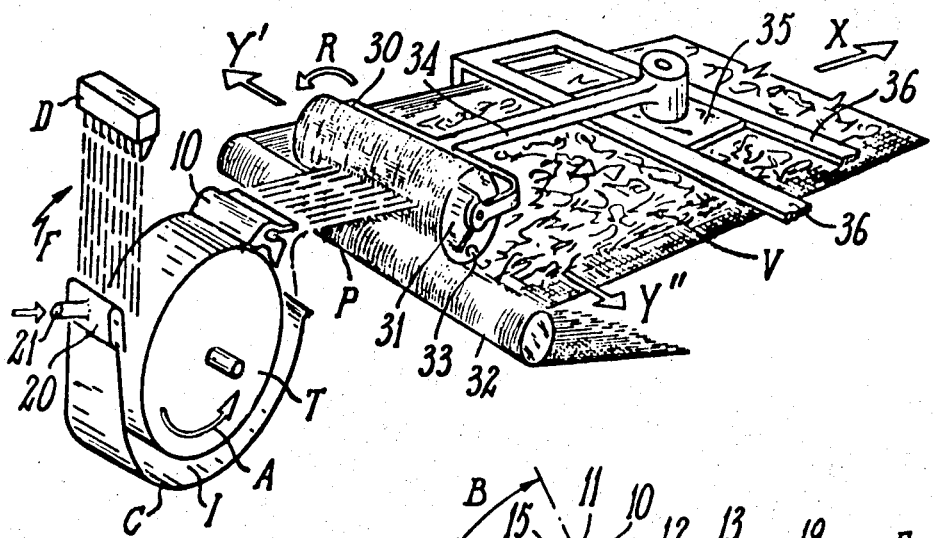
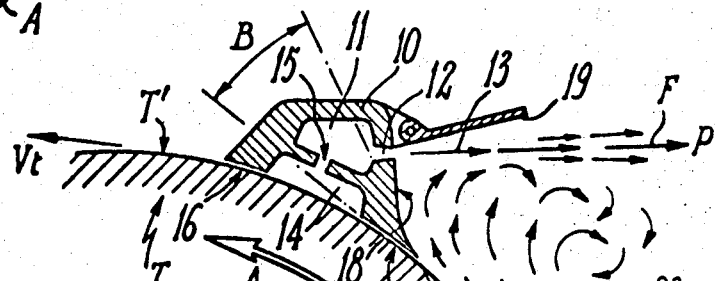
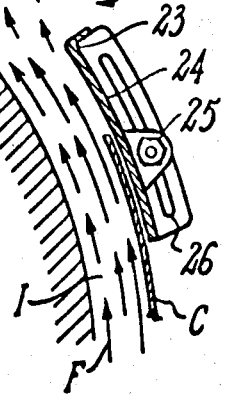
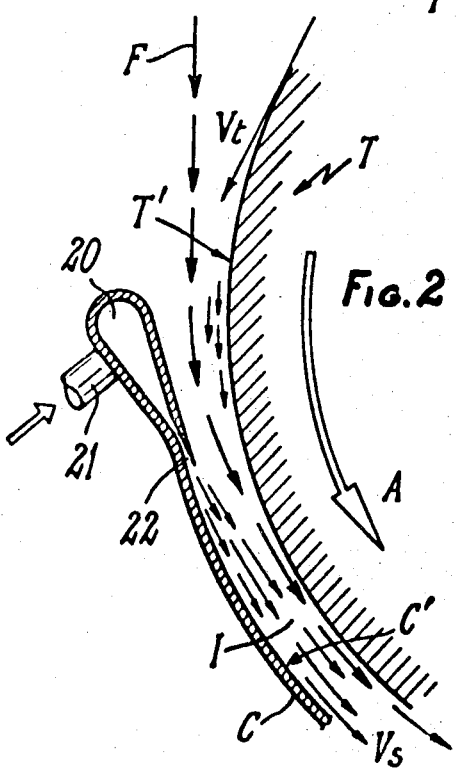

3,681,169
APPARATUS FOR THE CONTINUOUS MANUFACTURE OF WICKS, THREADS AND SCREENS FROM THERMOPLASTIC MATERIALS
Valentino Wiquel, Besana Brianza, Italy, assignor to Compagnie de Saint-Gobain, Neuilly-sur-Seine, France
Filed Nov. 13, 1968, Ser. No. 775,483
Claims priority, application Italy, Nov. 20, 1967, 22,915/67; Nov. 22, 1967, 22,981/67
Int. Cl. B29j 5/00
U.S. Cl. 156—371
27 Claims

ABSTRACT OF THE DISCLOSURE

The production of continuous lengths of mats, screens, wicks and the like, from thermoplastic fibrous material, particularly glass fibers, by dropping a plurality of freshly formed filaments issuing from a high-capacity spinneret containing the molten material into a passage defined by a horizontally disposed rotatable drawing-out drum and a casing spaced from and surrounding substantially the lower portion of the drum. Air currents in the passage, coupled with the rotation of the drum, result in an attenuation and orientation of the fibers within the passage, and they are diverted from the outlet of the passage by at least one layer of air directed in a plane parallel to the rotary axis of the drum and in intersecting relation to the air currents issuing from the passage with the fibers entrained therein, to divert the latter from the drum onto a receiving surface therefor, which may assume different forms in dependence upon the specific character of the product sought to be obtained.

---

The present invention relates to improvements in the methods of and apparatus for the continuous production of screens, felts, mats, wicks, threads and the like, from fibers of thermoplastic materials, particularly glass fibers. The invention is concerned especially with methods employing such extruded fibers in the plastic state, which are drawn out through contact and entrainment about a rotating drum provided with a casing or cover defining an intermediate space in which the fibers are attenuated by a current of air, these fibers being collected under such conditions and in the form required for obtaining the desired product.

It is readily acknowledged that the known methods and devices for such manufacture are not entirely satisfactory. Thus, it is difficult to effect the travel and distribution of the fibers which are used, over the receiving devices therefor, with all the desired precision, selectivity and uniformity. This difficulty exists particularly when spinning nozzles with a large number of perforations are used, in installations of high output capacity.

The present invention consequently provides an improved process wherein the difficulties mentioned above are eliminated, by assuring a regular and uniform detachment of the fibers from the drawing-out drum and their precise and uniform transfer to the receiving devices therefor.

In accordance with the invention, the orientation and transfer of the fibers which have left the drawing-out drum onto the means designed to receive them is executed by a layer of air projected in a plane parallel to the axis of rotation of the drum and cutting the air current carrying the fibers around said rotary drum in order to detach these fibers from the drum and convey them towards the receiving means therefor.

According to the invention, the orientation of the air layer and/or that of the air current at its outlet from the casing is so regulated as to attain the orientation and movement of he fibers in a predetermined direction.

According to the invention, the air current carrying the fibers about the rotating drum is created by rotation of the drum itself or is realized by one or several jets of air emitted in the space between this drum and an accompanying enveloping cover, these air jets having a linear velocity at least equal and preferably higher than the peripheral velocity of the drum.

The invention also concerns an apparatus for the execution of the method described above and contemplates an arrangement which comprises: a drawing-out drum surrounded at least partially by an accompanying cover which defines with said drum a space through which the drawn-out fibers travel, and blower means comprising one or more nozzles whose axes or planes of symmetry are coplanar in order to obtain a layer of air, these blower means being placed at the periphery of the drum at a point located beyond the outlet of the drawn-out fibers from said space in order to convey and transfer, in the plane of this air layer, the fibers detached from the drum toward their reception zone, whereat the formation of the desired product is effected.

In accordance with a variant embodiment of the invention, a wick is formed from the drawn-out fibers, by receiving these fibers conveyed by said air layer over a surface moving laterally at a speed equal to the linear speed of the fibers in the plane in which said air layer carries them.

According to one characteristic of this variant embodiment, it is possible to obtain simultaneously at least two wicks, the air layer detaching the fibers from the drawing-out drum being divided into at least two bundles, which are disposed or oriented in different planes to transfer the fibers selectively onto two or more receiving surfaces.

Other characteristics and advantages of the invention will appear from the following description taken in conjunction with the accompanying drawing which illustrate non-limiting examples, and wherein FIG. 1 is a schematic perspective view of one arrangement in accordance with the invention;

FIG. 2 is a vertical sectional view of the drawing-out drum in the zone of introduction of the fibers;

FIG. 3 is a vertical sectional view of the drum in the zone where detachment of the drawn-out fibers and their transfer toward the receiving means takes place;

Figure 4:
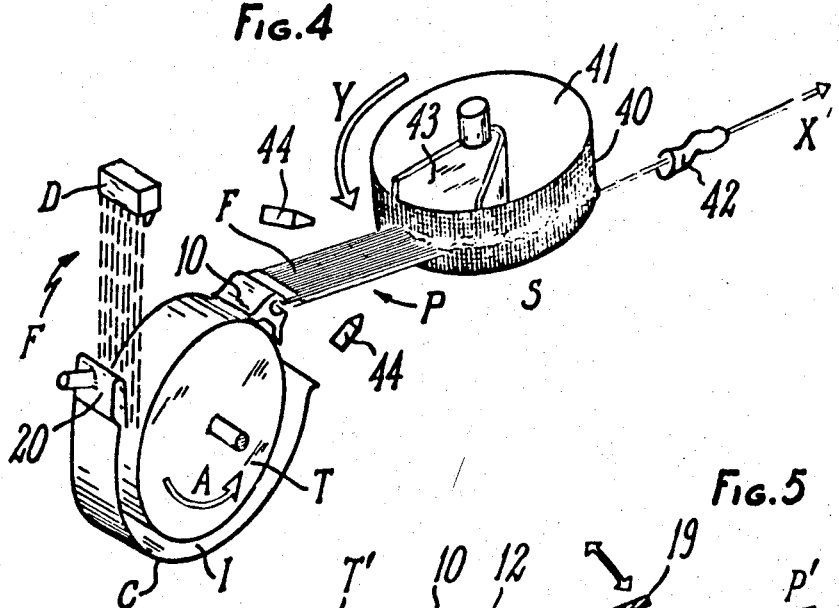
FIG. 4 is a schematic perspective view similar to that of FIG. 1, illustrating a variant arrangement of the invention for the fabrication of the cores or wicks of glass fibers.

In FIG. 1 is shown an arrangement for the continuous production of a felt or screen V of glass fibers, which comprises a cylindrical drum T rotating about its axis at a predetermined angular speed in the direction indicated by arrow A, and the lower part of which is enveloped by a case, cover or conveyor C, which defines with the drum, an intermediate space I. The fibers F of thermoplastic material, glass in particular, are produced, for example, by a drawing-plate D or similar fiber-spinning device.

This installation comprises means for detaching fibers F from the surface of drum T at the outlet from the intermediate space I, and for transferring them as far as the receiving means therefor, one embodiment of whcih will be described later with reference to FIG. 1.

In accordance with the invention, the detachment of fibers from the drum and their transfer to the receiving means, are effected by means illustrated in one of their possible forms in FIG. 3. These means comprise a blower 10, which rests on the dorsal section of cylindrical surface T' of drum T, comprising at least one enclosure 11, suitably connected to a source of air (not shown), or another compressed gas, and which communicates with the outside through one or more elongated slots, forming one or more appropriately spaced nozzles, which give rise to a layer of air.

As indicated above, blower 10 is supported on the surface T' of the drum. This support is not always realized physically between the solid parts, but by means of an interposed cushion of air formed in one or more spaces 14 provided in body 10 of the blower, which spaces open toward the surface by the drum and are supplied by air under pressure, which by virtue of openings 15 may connect the space or spaces 14 with the enclosure 11 or again, to a separate air supply conduit. In the parts adjacent to surface T', blower 10 comprises profiled sections 16 and 17 which conform closely to the contour of surface T' of the drum, but without coming in contact with the latter by reason of thin air streams escaping from the space or spaces 14.

In addition, the front part 18 of blower 10 is conveniently inclined and preferably curved in concavely so as to facilitate deflection of the air current and the fibers leaving the intermediate space I. In particular, this front part 18, and essentially in the zone where the air layer emitted by blower 10 and the fibers in the zone adjacent to surface T' come into contact, forms with the tangent to surface T' in said zone, an angle B less than 90°, which, for example, may range between 20° and 80°.

The blower may also be provided with adjustable directing and deflecting system, which may be formed, for example, by a movable vane 19 in order to change the direction of the air layer in a vertical plane.

FIG. 2 shows an example of a blower system for the formation of the air current in the intermediate space I as well as to obtain adherence of fibers F on the surface of drum T. It is known that the rotation alone of the drum gives rise to a sufficiently strong ventilating effect on the circumference of the drum, and especially in the intermediate space I, due to known aerodynamic phenomena, in particular for the entrainment of the layer disposed on the surface of the drum. It is evident that the current of air which arises in the intermediate space I by the effect of rotation indicated by arrow A, cannot have a speed greater than the tangential speed $Vt$ of the surface of the drum, which is thus the limit of the speed of the air at the interior of the intermediate space I, by the sole effect of the rotation. This current, which for simplicity will be called by the term "current of rotation," does not, however, coincide with the transport of fibers F at speeds which are not lower than the tangential speed $Vt$ of the drum itself.

It is also known that centrifugal force is opposed to the adherence of fibers F on the drum, which constitutes one of the causes of irregularity in the functioning of drawing-out systems and partial winding about the drum.

By providing blower means, for example, a second blower 20, placed preferably at the entrance to the intermediate space I, the above-mentioned disadvantages are eliminated. This blower, supplied with compressed air or gas through one or more conduits 21, can be put into operation by several different methods. In the illustrated example, an opening 22 formed by one or more slots or orifices close together, is so oriented as to direct the air layer along a direction which is principally tangential to the interior surface C' of the casing C. This second blower is supplied under sufficient pressure to impart to the discharged air a speed $Vs$ at least equal to, and preferably higher than, the tangential speed $Vt$ of the drum, and in particular to arrange that this higher speed $Vs$ (FIG. 2), is maintained all along the intermediate space in which indeed, the aerodynamic conditions are reversed with respect to those which would be established by the effect of only the rotation of the drum. In fact, in the latter case, the speed of the air would be maximal, at the limiting value of $Vt$, in contact with the surface T' of the drum, and would decrease progressively toward the outside, and would be minimal, with a lower limiting value of zero, on the limiting layer in contact with surface C' of the casing C. By virtue of the action of the second blower 20, and not taking into account the latter limiting layer, which in practice is imperceptible, the speed of the thin air streams in the intermediate space I increases from the inside toward the outside, and is at its minimal value, corresponding to $Vt$ in contact with surface T' of the drum.

Obviously, other auxiliary blowers may be suitably located between the inlet and outlet of the intermediate space in order to maintain these conditions over the entire surface of the drum.

A series of small arrows are shown in FIGS. 2 and 3 to indicate the maximum progression of the thin air streams on the inside and downstream in the intermediate space I, and heavier arrows indicate the progression of the fibers F. These fibers, falling from their formation zone at spinneret D or the like, are admitted into the intermediate space I, and are carried along by the air current existing in this space. Since the speed of the air streams in the space I is higher in the layers farthest from the surface T' of the drum by virtue of the action of the second blower 20, the fibers which tend to detach themselves from this drum surface are accelerated by the current in which they find themselves, and this produces a self-winding effect about this drum. Thereby is obtained a suitable and constant adherence of the fibers on surface T' of the rotating drum.

It will be noted, in this respect, that this adherence as well as the drawing-out of the fibers which results from it, may be controlled and modified in their intensity, with the installation as described above. The tractive force is taken advantage of especially in order to obtain a drawing-out of the fibers, which originally are essentially plastic. The value of the tractive force should consequently be rigorously controlled and fixed, as well as the function of the force with which the fibers are wound and applied against the drum. It is evident that by regulating the air pressure of the second blower 20 and/or the other blowers which may be placed in space I, gradients of speed between the thin gaseous streams at various points of the cross-section of space I can be created and maintained exactly. The greater the speed of the air streams remote from the surface T' of the drum relative to the tangential speed $Vt$ of this surface, the greater is the energy with which the fibers are constrained to adhere to the drum itself.

FIG. 3 shows how the drawn-out fibers are transferred to the receptor means therefor through the action of the principal blower 10. It is assumed that conditions at the extremity of the intermediate space I are maintained, similar to those which have been described, with the presence of the air currents which, in the most remote layers in the intermediate space, have a linear speed greater than that of the speed of rotation of the fibers F in contact with the surface T' of the drum. At the outlet of the intermediate space, defined by edge 23 of casing or cover C, the conditions are modified, either as a consequence of the disappearance of the wall of this covering, or as a result of the presence of the surface acting as a deflector which is presented by the frontal part 18 of blower 10, or finally under the effect of the air layer 13 which is emitted by this blower. This air layer is discharged along the plane P.

At the end of the wall of covering C, the blown air current can escape toward the outside, and its speed is diminished thereby, and consequently diminishes to a value lower than the tangential speed $Vt$ of the drum. As a result, the conditions which prevailed upstream and which caused the fibers to adhere to the surface of the drum are interrupted in this zone. The current of rotation, in its turn, is deviated by the surface serving as deflector 18. These combined effects lead to the regular and uniform detachment of the fibers from the drum and to their drawing-out by the action of the air layer 13 to which is imparted an elevated linear speed, which issues from the blower 10.

The air current coming from blower 20 also escapes, and is intercepted by air layer 13 emitted by blower 10 to create a turbulent zone below the plane P of this layer, which disperses in the space below the latter. Consequently, it is evident that no marked expansion takes place between the current of rotation, the current produced by blower 20 and the air layer produced by blower 10, since in practice these currents mingle and blend in large measure. The distinction made above facilitates the comprehension of the aerodynamic phenomena engendered and taken advantage of by the invention, phenomena which in practice lead to the entry of fibers F into the air layer 13 in plane P, and to their entrainment by this layer.

It has been established that because of the reciprocal interference of the above-mentioned currents in the plane P, there results a nearly perfectly smooth and non-turbulent current comprised in an angle of greatly reduced amplitude in a vertical plane. This current which extends transversely across the entire width of the blower 10, a width which is naturally much larger than the bundle of fibers which leaves the drum, is stabilized and maintained on a sufficiently long course, of the order of several decimeters.

Granted that the production of the phenomena described above at the outlet of the intermediate space I depends on a large number of variables, such as the mass and speed of the fibers, the linear speed of the air currents, the formative conditions of the state of turbulence, etc., the distance between the extremity of covering C and blower 10, as well as the space situated below plane P for the formation of the zone of turbulence, have a great influence on said phenomena. This is the reason why the end of the covering, that is, its extreme edge 23, is preferably formed by the upper edge of an element which itself forms the terminal part of the covering, and which is supported in an adjustable manner, for example by screws 25 which engage in slots 26 or the like. Likewise, the axial positioning of this terminal part of the covering may also be adjusted in order to obtain, if necessary, a displacement or a modification of the configuration of this terminal part, which is capable of enhancing these phenomena, especially the deviations and variations in speeds of air streams leaving space I.

The final result obtained by the invention is the perfect, uniform, and regular formation of a flat sheaf or bundle of parallel fibers and in the same plane, i.e., in plane P, which is defined by the air layer 13. Consequently, these fibers are directed selectively and with the greatest precision and regularity in a well-determined position toward the receiving means therefor.

These receiving means, which constitute the first element of the apparatus for producing the screen, felt, panel, core, wick or other article, may be in any form which conforms to known techniques. In FIG. 1 is shown in simple fashion a means and an arrangement for forming a screen V, for example. The receiving means may be constituted by an air-permeable roller 30, which may be of a reticulated or liberally perforated structure, for example, and which is rotated in the direction R and oriented so as to receive, above a generatrix, the fibers conveyed in the plane P. Deposit of fibers on the drum is effected by suction, produced by means of an inner cap or cover 31 which extends to the point at which the fibers rejoin the surface of a conveyor 32, progressing in direction X, and on which the screen is formed. The transfer of fibers from roller 30 to conveyor 32, is effected by the emission of a jet or flat flow of air emitted, for example, by a perforated tube 33 inside said roller 30, which is in accord with techniques in current practice. Obviously, other known receiving means could be used, for example, an inclined conveyor belt. The fibers could also be directed projected onto conveyor 32.

For the formation of a screen or felt B of greater width than that of the flat sheaf of fibers projected in plane P, other means can be used. For example, the nozzles of blower 10 may be guidable and placed alternately in plane P, to span a predetermined angular opening, in such a way that the effective receiving zone is widened.

In the example shown in FIG. 1, the roller 30 has a width equal to or greater than half the width of the screen being formed, and greater than the width of the flat sheaf of fibers projected in plane P. It is supported, for example, by an arm 34 and a carrier 35 moving transversely along rails 36 or the like, in such a way that, through alternative displacements along Y', Y'', the fibers projected in plane P are alternately received at different points along the width of roller 30, and are alternately transferred from it to various zones of the width of conveyor 32 for the formation of the screen V having the desired width. This procedure may also be applied to the formation of other products, for example, felts, panels and similar articles.

Figure 6:
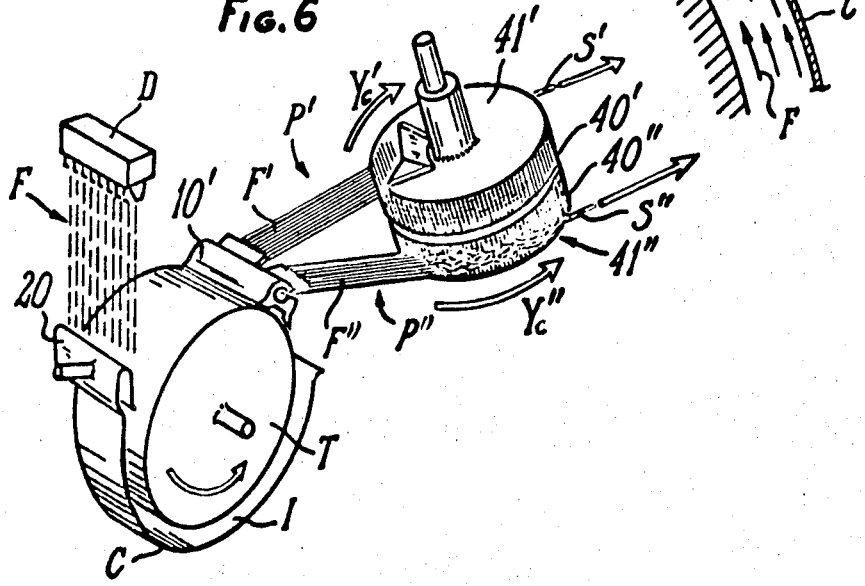
FIG. 6 is a schematic perspective view similar to that of FIG. 4, illustrating a variant of the invention provided for the simultaneous manufacture of two cores or wicks.

In the variant embodiments of the invention shown in FIGS. 4 and 6, which are designed especially for the production of wicks, cores, threads or twisted yarn or filaments, advantageous use is made of the characteristics of the constant direction of the projection of the fibers in the plane P by the air layer emitted by blower 10, and the maintenance of the fibers themselves in said plane with satisfactory precision, thereby making possible their deposition or reception on a surface each of whose points are located in this plane or remain parallel to this plane, so that these fibers are received in the form of an extremely thin bundle.

As shown in FIG. 4, the receptor surface is constituted by a reticulated or perforated peripheral band 40, of a roller 41 rotating in the direction Y, and preferably about an axis perpendicular to plane P of the flat bundle of fibers F. The roller is shifted with respect to the edge of said bundle in such a way that the fibers strike the surface 40 over a receding arc by virtue of the rotary movement Y. Fibers F are consequently received in the form of a wick S which is then separated and drawn-out tangentially at the surface of band 40. It next passes for example, through a known system 42 to impart a false twist thereto and thereafter it is drawn-out in the direction X for its transformation and final winding. The reception and temporary retention of the fibers on the surfaces 40 are effected preferably by known indraft of air systems such as a draft produced by suction, for example, which may be attained by a suction cap or head 43 interiorly of roller 41 and interposed in the zone in which it is desirable to attain this temporary retention. The apparatus is completed naturally by any other member, means and/or accessory drive or control device which may be desirable. For example, small vaporizing nozzles 44 are shown in FIG. 4 for applying a preliminary dressing or the like to the fibers.

Figure 5:
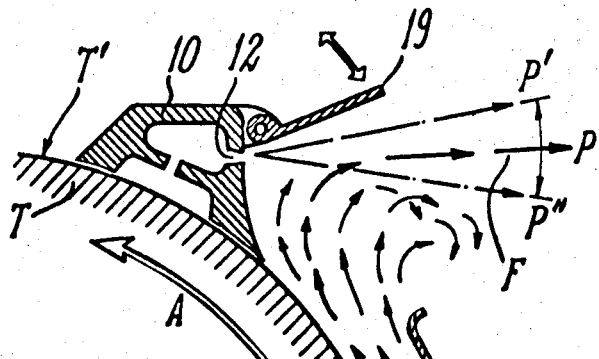
FIG. 5 is a vertical sectional view similar to that of FIG. 3, illustrating a different arrangement at the outlet of the fibers.

Depending upon the positioning of blower 10, the orientation of its nozzles and/or deflector 19, the inclination of plane P with respect to the horizontal can be modified with precision, for example, within the amplitude of dihedral angle P'-P'', shown in FIG. 5. This possibility is used to advantage in the embodiment illustrated in FIG. 6, in order to obtain from a very large number of fibers, several cores or wicks, two for example, S' and S''. This important result on an industrial scale has been obtained by arranging that drum T have a sufficiently wide band, onto which are conveyed a large number of fibers F, produced, for example, by means of a spinning nozzle D having a sufficiently large number of holes. Two blowers 10 or a single blower 10' having more numerous and diversely oriented nozzles and/or more numerous diversely oriented deflectors are positioned adjacent to the drum T. Thus, layers of air oriented along different planes P′ and P″ are obtained, forming a variable angle with respect to the horizontal. Fibers F′ and F″ carried in said planes P′ and P″, respectively, are conveyed to different points of the surface designed to receive them, preferably on two distinct surfaces, formed by peripheral bands 40′ and 40″ of two separate rollers 41′ and 41″, respectively, which are arranged coaxially but which rotate in opposite directions Yc′ and Yc″, respectively, so as to operate, practically, two systems of symmetrical productions, each corresponding to the system shown in FIG. 4.

The apparatus described above can naturally be operated in various forms and ways. For example, the receiving surfaces may be constituted by conveyor belts or by rollers and the like. The direction of movement of these surfaces may also be exactly in the plane P, or in planes P′ and P″ of the flat sheaf or sheaves of fibers conveyed in the air layer or layers, or these may form a small angle with said planes so as to assure that the fibers are not superposed in the course of the depositing phase, but are arranged, for example, side by side, parallel, and close together, in order to produce especially ribbons of continuous fibers or "rovings," and the like.

In addition, it is well understood that the device is able to embody numerous other means and auxiliary devices for the actuation and control thereof. For example, use may be made of means for the projection or application of binders, sizings, dressings, and the like, to the fibers, as well as means for calendering the final fibrous product. Devices may be necessary for the thermal treatment of the product to effect the polymerization of the sizings. These means, well known to those skilled in the art, need not be described nor shown here.

It is also well understood that the invention is not limited to the illustrated embodiments described and shown herein, but embraces all variants thereof.

I claim:

1. In an apparatus for producing continuous lengths of mats, screens, wicks and the like, from thermoplastic fibrous material, such as glass fibers, issuing from a supply of the thermoplastic material, in a molten state, in the form of a plurality of closely spaced molten streams in parallel relation, which solidify at least partially in the course of their gravitational fall to form a plurality of parallelly arranged fibers,
    (a) means for drawing out and collecting said freshly formed fibers comprising
    (b) a horizontally disposed rotary drum with a casing spaced from the lower portion thereof to define a passage therebetween for the reception of the dropping fibers,
    (c) means for generating gaseous currents within said passage to draw-out the freshly formed fibers entrained by the rotating drum around the lower portion of the circumference thereof, and
    (d) means adjacent to the upper portion of said drum, but out of physical contact therewith, beyond the outlet of said passage, to form a physical baffle member for deflecting the air currents as well as the freshly formed fibers conveyed thereby, in their upward flow and adjacent to said drum, said baffle member including blowing means provided with at least one nozzle opening for directing a gaseous layer in a substantially horizontal direction towards a receiving surface for the fibers for complementing the deflection of said air currents and fibers from said passage and conveying the fibers therefrom in the form of a thin sheaf.

2. An apparatus as set forth in claim 1, wherein the gaseous currents within said passage are generated solely by the rotation of the rotary drum.

3. An apparatus as set forth in claim 2, including gas-injecting means associated with the casing adjacent to the rotary drum for generating gaseous currents within said passage having a velocity at least equal to the peripheral velocity of the rotary drum.

4. An apparatus as set forth in claim 3, including means for injecting gas into said passage under sufficient pressure to impart a velocity to the gaseous currents therein which decrease from a maximum adjacent to the inner wall of said casing to a minimum at the periphery of said rotary drum.

5. An apparatus as set forth in claim 1, wherein said last-mentioned blowing means comprises a concavely curved frontal wall for enhancing aerodynamic effects of the merging gaseous components beyond the outlet of said passage.

6. An apparatus as set forth in claim 1, including a deflector plate on said blowing means above said nozzle opening for controlling the direction of said gaseous layer.

7. An apparatus as set forth in claim 5, wherein the angle between said frontal wall and the tangent of said rotary drum thereat is less than 90°.

8. An apparatus as set forth in claim 5, wherein the angle between said frontal wall and the tangent of said rotary drum thereat ranges from 20° to 80°.

9. An apparatus as set forth in claim 1, wherein said blowing means comprises a plurality of nozzle openings oriented in divergent directions to spread the thin sheaf of fibers conveyed by the gaseous layer.

10. An apparatus as set forth in claim 1, including an adjustable member at the outlet of said casing for regulating the incidence of the gaseous currents and the fibers issuing from said passage, relative to the plane of the gaseous layer discharged from the last-mentioned means for diverting the fibers toward the receiving surface therefor.

11. In combination with an apparatus as set forth in claim 1, wherein the receiving surface for the fibers comprises a movable member in the path of the gaseous layer with the sheaf of fibers conveyed thereby for collecting the latter for mutual agglomeration, and means for moving said member and conveying away the agglomerated fibers therefrom for the production of the continuous length of the final product.

12. In combination with an apparatus as set forth in claim 1, wherein the receiving surface for the fibers comprises
    (a) a movable member having a reticulated body in the path of the gaseous layer with the thin sheaf of fibers conveyed thereby,
    (b) suction means on a limited sector of the interior of said reticulated body for temporarily retaining the fibers on the external surface thereof, and
    (c) means for conveying the retained fibers beyond the suction means to release the fibers for mutual interengagement to form the continuous length of the final product.

13. An apparatus as set forth in claim 12, wherein said movable member is a rotary roller with a reticulated peripheral surface disposed in the plane of said gaseous layer, and an endless conveyor below said roller for receiving the fibers released from the latter following the elimination of the suction effect on the limited sector of said roller.

14. An apparatus as set forth in claim 1, including means for regulating the gaseous currents issuing from said passage.

15. An apparatus as set forth in claim 1, including means in said passage for regulating the gaseous currents therein which effect the drawing out of the fibers.

16. An apparatus as set forth in claim 1, including means in said passage for regulating the gaseous currents therein which effect the drawing out of the fibers and additional means for regulating the gaseous currents with the fibers entrained thereby which issue from said passage.

17. In an apparatus for producing continuous lengths of mats, screens, wicks and the like, from thermoplastic fibrous material, such as glass fibers, issuing from a supply of the thermoplastic material, in a molten state, in the form of a plurality of closely spaced molten streams in parallel relation, which solidify at least partially in the course of their gravitational fall to form a plurality of parallelly arranged fibers,
- (a) means for drawing out and collecting said fibers comprising
- (b) a horizontally disposed rotary drum with a casing spaced from the lower portion thereof to define a passage therebetween for the reception of the dropping fibers,
- (c) means for generating gaseous currents within said passage to draw-out the fibers entrained by the rotating drum, and
- (d) means beyond the outlet of said passage for diverting the fibers from the drum in the form of a thin sheaf conveyed by a gaseous layer blown in a transverse direction towards a receiving surface for the fibers, said means comprising blowing means adjacent to the rotary drum provided with at least one nozzle opening for directing the gaseous layer issuing therefrom in a plane which intersects that of the gaseous currents issuing from said passage, said blowing means also having a concavely curved frontal wall for enhancing aerodynamic effects of the merging gaseous components beyond the outlet of said passage, as well as curved surface portions adjacent to the periphery of the rotary drum conforming to the curvature of the latter with means for interposing a thin gaseous film between said conforming curved surfaces.

18. An apparatus as set forth in claim 17, wherein said blowing means is provided with internal passages, whereby the gaseous layer and the gaseous film are supplied from the same source of compressed gas.

19. In an apparatus for producing continuous lengths of mats, screens, wicks and the like, from thermoplastic fibrous material, such as glass fibers, issuing from a supply of the thermoplastic material, in a molten state, in the form of a plurality of closely spaced molten streams in parallel relation, which solidify at least partially in the course of their gravitational fall to form a plurality of parallelly arranged fibers,
- (a) means for drawing out and collecting said fibers comprising
- (b) a horizontally disposed rotary drum with a casing spaced from the lower portion thereof to define a passage therebetween for the reception of the dropping fibers,
- (c) means for generating gaseous currents within said passage to draw-out the fibers entrained by the rotating drum,
- (d) means beyond the outlet of said passage for diverting the fibers from the drum in the form of a thin sheaf conveyed by a gaseous layer blown in a transverse direction towards a receiving surface for the fibers,
- (e) an adjustable member at the outlet of said casing for regulating the incidence of the gaseous currents and the fibers issuing from said passage, relative to the plane of the gaseous layer discharged from the last-mentioned means for diverting the fibers toward the receiving surface therefor, said member being of the same curvature as said casing with an arcuate slotted opening on at least one edge thereof, and fastening means for fixing said member to said casing at variable points along said slotted opening.

20. In an apparatus for producing continuous lengths of mats, screens, wicks and the like, from thermoplastic fibrous material, such as glass fibers, issuing from a supply of the thermoplastic material, in a molten state, in the form of a plurality of closely spaced molten streams in parallel relation, which solidify at least partially in the course of their gravitational fall to form a plurality of parallelly arranged fibers,
- (a) means for drawing out and collecting said fibers comprising
- (b) a horizontally disposed rotary drum with a casing spaced from the lower portion thereof to define a passage therebetween for the reception of the dropping fibers,
- (c) means for generating gaseous currents within said passage to draw-out the fibers entrained by the rotating drum,
- (d) means beyond the outlet of said passage for diverting the fibers from the drum in the form of a thin sheaf conveyed by a gaseous layer blown in a transverse direction towards a receiving surface for the fibers, said means comprising blowing means adjacent to the rotary drum provided with a plurality of nozzle openings oriented in divergent directions to direct the gaseous layer issuing therefrom in a plane which intersects that of the gaseous currents issuing from said passage, thereby to spread the thin sheaf of fibers conveyed through the latter,
- (e) said receiving surface for the fibers comprising a rotary roller with a reticulated peripheral surface in the plane of said gaseous layer issuing from said nozzle openings,
- (f) suction means on a limited sector of the interior of said reticulated peripheral surface for temporarily retaining the fibers thereon,
- (g) means for conveying the retained fibers beyond the suction means to release the fibers for mutual interengagement to form the continuous length of the final product,
- (h) an endless conveyor below said roller for receiving the released fibers, and
- (i) means for alternately reciprocating said rotary roller in the direction of its axis to gather the fibers conveyed by the wide gaseous layer discharged from the divergently directed nozzles for ultimate deposition onto said endless conveyor.

21. In an apparatus for producing continuous lengths of mats, screens, wicks and the like, from thermoplastic fibrous material, such as glass fibers, issuing from a supply of the thermoplastic material, in a molten state, in the form of a plurality of closely spaced molten streams in parallel relation, which solidify at least partially in the course of their gravitational fall to form a plurality of parallelly arranged fibers,
- (a) means for drawing out and collecting said fibers comprising
- (b) a horizontally disposed rotary drum with a casing spaced from the lower portion thereof to define a passage therebetween for the reception of the dropping fibers,
- (c) means for generating gaseous currents within said passage to draw-out the fibers entrained by the rotating drum,
- (d) means beyond the outlet of said passage for diverting the fibers from the drum in the form of a thin sheaf conveyed by a gaseous layer blown in a transverse direction towards a receiving surface for the fibers,
- (e) said last-mentioned receiving surface for the fibers comprising a roller mounted for rotation on a substantially vertical axis with a reticulated peripheral surface having a portion on one side of the axis in the path of the planar gaseous layer with the sheaf of fibers conveyed thereby,
- (f) suction means on a limited sector of the interior of said reticulated body for temporarily retaining the fibers on the external surface thereof, and
- (g) means for conveying the retained fibers beyond said suction means to permit the release thereof for mutual interengagement to form the continuous length of the final product by pulling the agglomerated fibers in the form of a continuous wick or core.

22. An apparatus as set forth in claim 21, including means for actuating said roller at a speed at which the peripheral velocity of the reticulated peripheral surface corresponds substantially to the lineal velocity of fibers conveyed by said gaseous layer.

23. In an apparatus for producing continuous lengths of wicks, cores, and the like, from thermoplastic fibrous material, such as glass fibers, issuing from a supply of the thermoplastic material, in a molten state, in the form of a plurality of closely spaced molten streams in parallel relation, which solidify at least partially in the course of their gravitational fall to form a plurality of parallelly arranged fibers,
 (a) means for drawing out and collecting said fibers comprising
 (b) a horizontally disposed rotary drum with a casing spaced from the lower portion thereof to define a passage therebetween for the reception of the dropping fibers,
 (c) means for generating gaseous currents within said passage to draw-out the fibers entrained by the rotating drum, and
 (d) means beyond the outlet of said passage for diverting the fibers from the drum, comprising
 (e) blowing means adjacent to said drum provided with a pair of laterally spaced nozzle openings for directing gaseous layers therefrom in slightly divergent planes with both layers intersecting the gaseous currents issuing from said passage, to direct two separate thin bundles of fibers by said gaseous layers in a transverse direction towards receiving surfaces for the fibers.

24. In an apparatus as set forth in claim 23, including a deflector plate on said blowing means above each nozzle for controlling the planes of divergence of said gaseous layers.

25. In combination with an apparatus as set forth in claim 24, wherein the receiving surfaces for the fibers comprise
 (a) a pair of rotary rollers each mounted for rotation on an axis substantially perpendicular to the plane of the gaseous layer directed thereto,
 (b) each roller having a reticulated peripheral surface with a portion on one side of the axis in the path of the respective planar gaseous layer with the thin sheaf of fibers conveyed thereby,
 (c) suction means on a limited sector of said portion at the interior of said respective peripheral surface, for temporarily retaining the fibers on the outside thereof, and
 (d) pulling means beyond each roller for pulling each wick of agglomerated fibers following its release by the suction means and the entrainment thereof for a short distance by the respective rotary roller.

26. An apparatus as set forth in claim 25, including control means for the entrainment of the fibers by the respective rollers by adjusting the peripheral velocity of the latter to conform substantially to the lineal velocity of the fibers conveyed by the respective gaseous layers.

27. An apparatus as set forth in claim 25, wherein said pair of rotary rollers are mounted on a substantially common axis and are rotatable in opposite directions.

References Cited
UNITED STATES PATENTS

| | | | |
|---|---|---|---|
| 2,830,648 | 4/1958 | Haddox | 156—371 |
| 2,846,348 | 8/1958 | Marzocchi et al. | 156—377 |
| 2,931,421 | 4/1960 | Schuller | 156—371 |
| 3,158,668 | 11/1964 | Johnson | 156—377 |

BENJAMIN A. BORCHELT, Primary Examiner

H. J. TUDOR, Asssistant Examiner

U.S. Cl. X.R.

156—62.2